United States Patent
Kim et al.

(10) Patent No.: US 11,978,264 B2
(45) Date of Patent: May 7, 2024

(54) SCALABLE ROAD SIGN KNOWLEDGE GRAPH CONSTRUCTION WITH MACHINE LEARNING AND HUMAN IN THE LOOP

(71) Applicant: Robert Bosch GmbH, Stuttgart (DE)

(72) Inventors: Ji Eun Kim, Pittsburgh, PA (US); Kevin H. Huang, Pittsburgh, PA (US); Mohammad Sadegh Norouzzadeh, Pittsburgh, PA (US); Shashank Shekhar, Ranchi (IN)

(73) Assignee: Robert Bosch GmbH (DE)

( * ) Notice: Subject to any disclaimer, the term of this patent is extended or adjusted under 35 U.S.C. 154(b) by 449 days.

(21) Appl. No.: 17/404,295

(22) Filed: Aug. 17, 2021

(65) Prior Publication Data
US 2023/0056672 A1  Feb. 23, 2023

(51) Int. Cl.
*G06N 5/02* (2023.01)
*G06F 18/21* (2023.01)
(Continued)

(52) U.S. Cl.
CPC ........ *G06V 20/582* (2022.01); *G06F 18/2178* (2023.01); *G06N 5/02* (2013.01); *G06N 20/00* (2019.01)

(58) Field of Classification Search
CPC .... G06V 20/582; G06V 10/462; G06V 10/82; G06V 20/58; G06F 18/2178; G06N 5/02; G06N 20/00; G06N 5/022
(Continued)

(56) References Cited

U.S. PATENT DOCUMENTS

| | | | |
|---|---|---|---|
| 10,332,266 B2 | 6/2019 | Chen et al. | |
| 10,928,828 B2 | 2/2021 | Xu et al. | |
| 2022/0180184 A1* | 6/2022 | Cervantes | G06F 16/29 |

FOREIGN PATENT DOCUMENTS

| | | |
|---|---|---|
| CN | 106909886 A | 6/2017 |
| CN | 111178153 A | 5/2020 |

(Continued)

OTHER PUBLICATIONS

Kim et al., "Variational Prototyping-Encoder: One-Shot Learning with Prototypical Images", Dept. of Electrical Engineering, KAIST, Daejeon, Korea, MIT CSAIL, Cambridge, US, 2019, 9 pages.
(Continued)

*Primary Examiner* — Stephen P Coleman
(74) *Attorney, Agent, or Firm* — Dickinson Wright PLLC

(57) ABSTRACT

Systems and methods for constructing and managing a unique road sign knowledge graph across various countries and regions is disclosed. The system utilizes machine learning methods to assist humans when comparing a new sign template with a plurality of stored sign templates to reduce or eliminate redundancy in the road sign knowledge graph. Such a machine learning method and system is also used in providing visual attributes of road signs such as sign shapes, colors, symbols, and the like. If the machine learning determines that the input road sign template is not found in the road sign knowledge graph, the input sign template can be added to the road sign knowledge graph. The road sign knowledge graph can be maintained to add signs templates that are not already in the knowledge graph but are found in real-world by integrating human annotator's feedback during ground truth generation for machine learning.

20 Claims, 9 Drawing Sheets

(51) Int. Cl.
  *G06N 20/00* (2019.01)
  *G06V 20/58* (2022.01)
(58) Field of Classification Search
  USPC .......................................................... 382/103
  See application file for complete search history.

(56) References Cited

FOREIGN PATENT DOCUMENTS

| | | |
|---|---|---|
| CN | 107784042 B | 2/2021 |
| DE | 102020004790 A1 | 11/2020 |

OTHER PUBLICATIONS

Kim et al., "Accelerating Road Sign Ground Truth Construction with Knowledge Graph and Machine Learning", arXiv:2012.02672v1 [cs.AI] Dec. 4, 2020, 16 pages.

* cited by examiner

Road Sign Knowledge Graph Management Dashboard

| Sign Template Source | Data Source | Workflow | Cropped Data |
|---|---|---|---|

Data Source ☑ Generic RSR Review ☐ Domain Specific RSR Review ☐ Generic KG ☐ Domain Specific RSR KG Search Physical Shape: Circle or Ellipse ▾

Additional Shape(s): ▾ BG Color: ▾ Country: US ▾

Text: Icon: ▾ State: ▾

Filters: CC ClassName: ▾ Sign ID:

☐ Show deleted sign

[Refresh] [Clear] [Search]

| Generic RSR Review (3) | Domain Specific RSR Review (0) | Generic KG (0) | Domain Specific RSR KG (0) |
|---|---|---|---|

| RSR Image | |
|---|---|
| (circle with diagonal line, R R) | Physical Shape: Circle<br>Additional Shape: CircleWithDiagonalLine<br>Background Color: Yellow<br>Border Color: Black<br>Text Color: Black<br>Icon Color:<br>Color For Shape Within Shape: CircleWithDiagonalLine:Black<br>Icon: NA<br>Text: R R<br>Variant Type: No |
| SignID: d35e4350-a59e-11ea-992d-1220fb89663f | [Confirm?] ✏️ 🗑️ |
| | Physical Shape: Circle<br>Additional Shape: CircleWithDiagonalLine |

FIG. 3

| Instruction | Example Image | Answers for example image |
|---|---|---|
| We want to train self-driving car with road signs. Your input will directly influence on the safety of self-driving cars in the future. This is an example of the road sign and answers. | YIELD HERE TO (example sign image) | 1. Physical Shape: Rectangle<br>2. Shape Inside of Physical Shape: Triangle Down, Arrow to Indicate Right<br>3. Icon: Person<br>4. Color of Icon: Black<br>5. Primary Color of the entire sign: White<br>6. Text: YIELD HERE TO |

← 401

Please look at the image carefully and provide an answer for each question on Right.

(image of sign with arrows, ONLY / OK) ← 405

1. What is the physical shape (the roadsign plate shape) that contain the road sign?
○ Circle or Ellipse
○ Cross
○ Cross with (an)other shape(s)
○ Diamond
○ Octagon
○ Pentagon
● Rectangle
○ Triangle Up
○ Triangle Down
○ Triangle Right
○ Triangle Left
○ Other shape (road number representation)

2. What is the border color of the physical shape?
● Black
○ Blue
○ Brown
○ Green
○ Orange
○ Pink
○ Purple
○ Red
○ Yellow
○ Yellow-Green
○ White

3. What are other geometric shapes INSIDE of the physical sign shape you answered in the 1st question? If there are many arrows, multiple choices are required.

☑ Arrow to indicate Forward 3.1. What are colors of this shape?
   ☑ Black    ☐ Blue    ☐ Brown
   ☐ Green    ☐ Orange    ☐ Pink
   ☐ Purple    ☐ Red    ☐ Yellow
   ☐ Yellow-Green    ☐ White

☐ Arrow to indicate Backward
☐ Arrow to indicate Right
☑ Arrow to indicate Left 3.1. What are colors of this shape?
   ☑ Black    ☐ Blue    ☐ Brown
   ☐ Green    ☐ Orange    ☐ Pink
   ☐ Purple    ☐ Red    ☐ Yellow
   ☐ Yellow-Green    ☐ White ☐ Circle or Ellipse
☐ Circle with diagonal line
☐ Circle with horizontal line
☐ Diamond
☐ Zebra Crossing
☐ Triangle Up

FIG. 4 (Continued)

4. Which icons are included to represent driving related objects? (multiple choices;select only correct one(s))

☐ Animal (e.g., horse, bird, cattle, frog, panda, any other animals)
☐ Infrastructure (e.g., bridge, tunnel, road)
☐ Nature (e.g., tree, rock, water fall)
☐ Person (e.g., pedestrian, adult, kid, rider, worker)
☐ Vehicle(e.g., passenger ar, bus, truck, tractor, motorcycle, camping car, caravan, trailer, tank, train, tram, bicycle, any kinds of vehicles that can be driven on the road)
☐ Other icons not listed above (e.g., horn, explosion, camera, traffic sign)
☑ No icons at all 5. What is the primary/background color (occupying the most area/pixels)of this road sign? If more than one color are primary, please select two colors.

☐ Black
☐ Blue
☐ Brown
☐ Green
☐ Orange
☐ Pink
☐ Purple
☐ Red
☐ Yellow
☐ Yellow-Green
☑ White 6. Is there any text in the sign?

⬤ Yes
◯ No

FIG. 4 (Continued)

6.1 Please type text including numbers in the sign from left top to right bottom as shown in the sign. (Do NOT use comma or #.)

ONLY OK 6.2 What is the main color of the text? 👆

☑ Black
☐ Blue
☐ Brown
☐ Green
☐ Orange
☐ Pink
☐ Purple
☐ Red
☐ Yellow
☐ Yellow-Green
☐ White 6.3 Does this text contain variant information (time, day, height, weight, distance, road number, street, town etc)?.

○ Yes
◉ No

FIG. 4 (Continued)

Road Sign Knowledge Graph Management Dashboard

| Sign Template Source | | Data Source | Workflow | | Cropped Data | |
|---|---|---|---|---|---|---|
| Cropped Signs | | Reported Information | Decision | | Status | Updated Date |
| Frame_no: 744<br>Frame_no: 738<br>Frame_no: 732<br>Frame_no: 726 | | Sequene name: DUR7501_20190316_150651_048<br>Comment: OtherSigns<br>Worker's selection: New sign<br>Sign template ID (if applicable):<br>Sign template URL: [TEXT]<br>Extracted Date: Tue, 17 Nov 2020 18:16:20 GMT | Selection ▽<br>New Sign<br><br>Sign template URL: [TEXT]<br>Sign template ID: | | Selection ▽<br>Decision made | Tue, 01 Dec 2020 10:40:24 GMT |
| Frame_no: 855<br>Frame_no: 849 | | Sequene name: DUR7501_20190316_150651_048<br>Comment: OtherSigns<br>Worker's selection: New sign<br>Sign template ID (if applicable): (?)<br>Sign template URL:<br>Extracted Date: Tue, 17 Nov 2020 18:34:38 GMT | Selection ▽<br>New Sign<br><br>Sign template URL: (?)<br>Sign template ID: | | Selection ▽<br>Decision made | Mon, 23 Nov 2020 09:00:10 GMT |
| Frame_no: 852<br>Frame_no: 846<br>Frame_no: 840<br>Frame_no: 834 | | Sequene name: DUR7501_20190316_104350_110<br>Comment: no match, OtherSigns<br>Worker's selection:<br>Sign template ID (if applicable): (?)<br>Sign template URL:<br>Extracted Date: Tue, 17 Nov 2020 18:34:56 GMT | Selection ▽<br><br>Sign template URL: (?)<br>Sign template ID: | | Selection ▽ | |

FIG. 6

SCALABLE ROAD SIGN KNOWLEDGE GRAPH CONSTRUCTION WITH MACHINE LEARNING AND HUMAN IN THE LOOP

TECHNICAL FIELD

The present disclosure relates to scalable road sign knowledge graph construction with machine learning and human in the loop.

BACKGROUND

Recognizing and understanding road signs are important features of advanced driver-assistance systems (ADAS), which are offered in modern vehicles via technologies such as road sign recognition (RSR). Such features may be mandatory according to guidelines that vary by each country. Recent RSR and ISA solutions rely on heavy use of machine learning methods. The number of road sign images to be annotated and categorized can be enormous, up to more than ten million each year. Any representative sample of these images will be of considerable size.

Road and traffic signs across multiple countries can be very different. Signs in each country follow several conventions (e.g., Vienna Convention, Southern Africa Development Community (SADC) Convention, Secretariat for Central American Economic Integration (SIECA per its Spanish acronym) Convention, Manual on Uniform Traffic Control Devices (MUTCD) Convention) but with variants among the countries. No universal machine classifier is available. To train such a universal classifier for signs in all countries, there should be a large enough dataset including as many annotated signs as possible. It is very challenging for those responsible for dataset management to go through all unlabeled videos/images in order to select videos and unlabeled data with rare signs.

SUMMARY

According to an embodiment, a system of constructing a road sign knowledge graph for use in machine-learning road sign recognition is provided. The system of constructing also includes a user interface. The constructing also includes a storage configured to maintain (i) a road sign knowledge graph including a database of stored road sign templates accompanied with a plurality of stored visual attributes of the stored road sign templates, and (ii) image data including video having a sequence of frames, and annotations of the frames that indicate visual attributes of road signs identified in respective frames. The constructing also includes a processor in communication with the storage and the user interface, the processor programmed to: receive an input road sign template from a road sign template source, determine a plurality of visual attributes of the input road sign template utilizing a visual attribute recognition machine learning model, query the road sign knowledge graph for one of the stored road sign templates having stored visual attributes that correspond with the plurality of visual attributes of the input road sign template, in response to the query yielding one of the stored road sign templates with stored visual attributes that correspond with the plurality of visual attributes of the input road sign template, not update the road sign knowledge graph to include the input road sign template, and in response to the query failing to yield one of the stored road sign templates with stored visual attributes that correspond with the plurality of visual attributes of the input road sign template, receive, via the user interface, annotations corresponding to the visual attributes of the input road sign template, and update the road sign knowledge graph to include the input road sign template.

According to an embodiment, a method of constructing and maintaining a road sign knowledge graph for use in a machine-learning road sign recognition system is provided. The method of constructing includes maintaining a road sign knowledge graph including a database of stored road sign templates accompanied with a plurality of stored visual attributes corresponding to the stored road sign templates. The constructing also includes maintaining image data including video having a sequence of frames, and annotations of one or more of the frames that indicate visual attributes of road signs identified in the respective frames. The constructing also includes receiving an input road sign template from a road sign template source. The constructing also includes determining a plurality of visual attributes of the input road sign template utilizing a visual attribute recognition machine learning model. The constructing also includes querying a road sign knowledge graph for one of the stored road sign templates having stored visual attributes that correspond with the plurality of visual attributes of the input road sign template. The constructing also includes confirming the input road sign template is already stored in the road sign knowledge graph based on a comparison between the visual attributes of the input road sign template and the one of the stored road sign templates. The constructing also includes preventing the input road sign template form being added to the road sign knowledge graph based on the confirming to prevent redundancy within the road sign knowledge graph.

According to an embodiment, a system includes a user interface. The system also includes a processor in communication with the display and programmed to: receive an input road sign template; execute a visual attribute prediction model to determine probabilities of predefined visual attributes present in the input road sign template; when the determined probabilities of predefined visual attributes correspond with stored visual attributes of one or more stored road sign templates within a road sign knowledge graph, prevent the input road sign template from being stored in the road sign knowledge graph; and when the determined probabilities of predefined visual attributes do not correspond with stored visual attributes of the one or more stored road sign templates, receive annotations corresponding to the visual attributes present in the input road sign template, and update the road sign knowledge graph to include the input road sign template.

BRIEF DESCRIPTION OF THE DRAWINGS

FIG. 3 illustrates an example of a user interface for performing the manual search of the existing road sign knowledge graph.

FIG. 4 illustrates an example of a user interface providing a crowdsourcing task for annotating the road sign knowledge graph.

FIG. 6 illustrates an example of a user interface having a dashboard for managing feedback from the video annotators.

DETAILED DESCRIPTION

Figure 1:
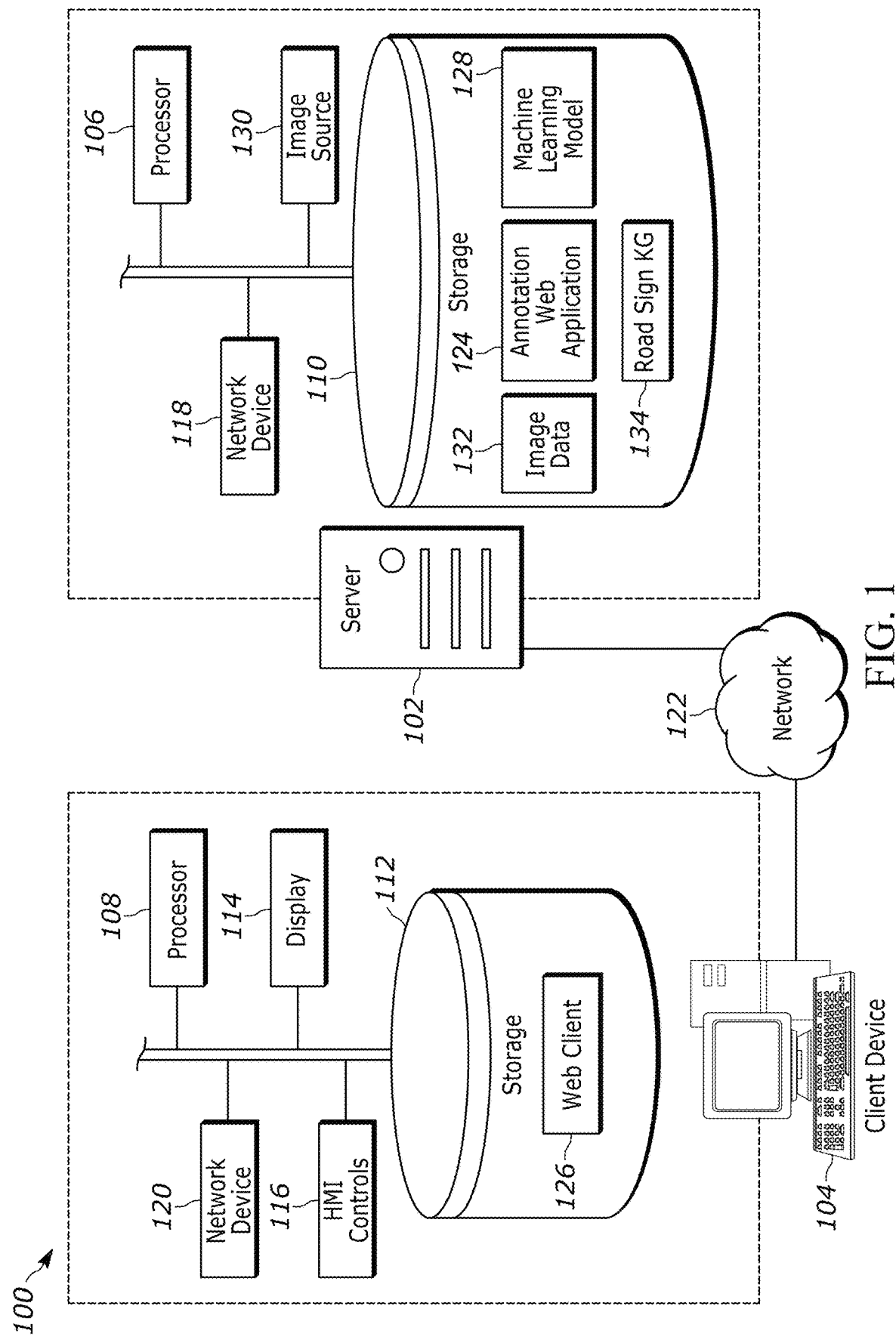
FIG. 1 illustrates a system for constructing and maintaining a road sign knowledge graph for use in machine-learning road sign recognition, according to an embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The following terms are used throughout this disclosure: road sign template, knowledge graph (KG) annotator, and video annotator. It should be understood that a non-limiting definition of these terms can be as follows. A road sign template is intended to refer to a prototype image specified in (for example) official government design documents to represent real road signs deployed on the road. A KG annotator is a human annotator that works on creating or validating signs for the road sign knowledge graph. Unless otherwise clear, the term "annotator" refers to a KG annotator. On the other hand, a video annotator is a human annotator that watches a video or images of a vehicle driving on the road and labels the road signs that appear in the video or images. The knowledge graph would be used by the video annotator to assist in the labeling effort.

Recognizing and understanding road signs are important features of advanced driver-assistance systems (ADAS), which are offered in modern vehicles via technologies such as road sign recognition (RSR), or intelligent speed adaption (ISA). These technologies may involve analyzing a seemingly unlimited supply of recorded video from driving vehicles, and spotting road signs on the recorded video. Annotators can sift through the recorded video to spot signs, categorize the spotted sign, and save the results in a database for later machine learning training. But this can be an unbearable task given the number of different road signs in the world.

Moreover, it is important to maintain a database of all possible diverse sign categories and classes, especially amongst varying states, regions, and countries. A car driving in one area of the world should also be equipped with the necessary knowledge of road signs in other areas of the world.

A knowledge graph may be utilized in conjunction with the machine learning system. A knowledge graph is a knowledge base that uses a graph-structured data model to integrate the data. In the context of a road sign knowledge graph, the knowledge graph may store a database of sign templates accompanied with a list of visual attributes or descriptions of the various road signs, such as the color, shape, font, size, etc. of the road sign. In one embodiment, the machine learning system may query the road sign knowledge graph to search for stored sign templates that have visual attributes that are similar to the newly detected road sign. In application, the machine learning system may receive an image of a stop sign, understand that the sign is red, has eight sides, and has text in white letters; the machine learning system can query the knowledge graph to extract signs that are red, have eight sides, and have text in white letters, and may be given a sign template of a stop sign form the knowledge graph.

There exist multiple sources and documents for road sign templates to build such a knowledge graph. If road sign templates are extracted from different sources, redundant road sign templates should be removed to maintain a unique list of signs. For example, United States federal road signs are available in different documents because sign specifications are added, changed, and deleted over time. Differences in sign templates for certain signs are negligible and hard to tell from a human perspective once a human performs a data annotation process. Also, the states within the United States use the federal signs differently; the states either adopt federal signs as-is, modify them, and/or manage state-specific road signs. Every state may act differently. And, each document from the federal government or a state government may contain different version of the same sign. This can lead to an unbearable amount of redundancy in the knowledge graph.

If the knowledge graph is constructed for other countries such, this may also create redundancy. For example, European countries may adopt the same standard (e.g., Vienna convention). However, each country might utilize signs from the Vienna convention standards as well as country-specific signs with country-specific visual representations, including language for example.

If a constructed road sign data management system (e.g., knowledge graph) has duplicate signs with slightly different color (e.g., red green blue, RGB) values or formats to represent the same sign, it would create inefficiency in constructing knowledge graph and using knowledge graph for road sign annotation and/or downstream machine learning processes.

It is non-trivial to maintain a unique list of road sign templates efficiently. During an annotation process, a human compares existing sign templates to check redundancy whenever a new sign is added to the database if no automated solutions are integrated. Road sign templates can be used for the data labeling and annotation tools by allowing human annotators to do a simple pattern matching task with simple visual attribute searching when classifying signs on the recorded videos/images. The number of signs that the human annotator needs to browse to find an exact match impacts the time it takes to label or annotate the image. It is also hard for humans to validate redundant signs if they only compare signs one by one. Also, the reduction of search space (e.g., reducing the number of signs in the knowledge graph) can help machine learning performance.

The embodiments described herein relates to systems and methods to construct and manage a unique road sign knowledge graph that contains unique road sign templates across different countries and regions at scale. The system reduces redundancy in the knowledge graph, and utilizes machine learning methods to assist humans to compare a new sign template with a list of existing sign templates already in the knowledge graph to check redundancy efficiently, and also when providing visual attributes of road signs such as shapes, colors, icons/symbols, text, and other visual representations on the signs used in road sign knowledge graphs.

The systems disclosed herein can construct road sign knowledge graphs with a single unique road sign template for each sign.

Furthermore, the road sign knowledge graph can be maintained to add signs that are not in the official knowledge graph document but are found in the real world by integrating a human annotator's feedback during ground truth generation for supervised (e.g., human in loop) machine learning. The disclosure herein provides an interface for a domain expert to have a proper action for each feedback to enhance the road sign knowledge graph to include and contain as many types of road signs as possible in the real world.

FIG. 1 illustrates an example system 100 of constructing a road sign knowledge graph for use in machine-learning road sign recognition, according to an embodiment. The system 100 includes a server 102 that hosts an annotation web application 124 that is accessible to client devices 104 over a network 122. The server 102 includes a processor 106 that is operatively connected to a storage 110 and to a network device 118. The server 102 further includes an image data input source 130 for the receipt of image data 132. The client device 104 includes a processor 108 that is operatively connected to a storage 112, a display device 114, human-machine interface (HMI) controls 116, and a network device 120. It should be noted that the example system 100 is one example, and other systems 100 may be used. For instance, while only one client device 104 is shown, systems 100 including multiple client devices 104 are contemplated. As another possibility, while the example implementation is shown as a web-based application, alternate systems may be implemented as standalone systems or as client-server systems with thick client software Each of the processor 106 of the server 102 and the processor 108 of the client device 104 may include one or more integrated circuits that implement the functionality of a central processing unit (CPU) and/or graphics processing unit (GPU). In some examples, the processors 106, 108 are a system on a chip (SoC) that integrates the functionality of the CPU and GPU. The SoC may optionally include other components such as, for example, the storage 110 and the network device 118 or 120 into a single integrated device. In other examples, the CPU and GPU are connected to each other via a peripheral connection device such as PCI express or another suitable peripheral data connection. In one example, the CPU is a commercially available central processing device that implements an instruction set such as one of the x86, ARM, Power, or MIPS instruction set families.

Regardless of the specifics, during operation, the processors 106, 108 execute stored program instructions that are retrieved from the storages 110, 112, respectively. The stored program instructions accordingly include software that controls the operation of the processors 106, 108 to perform the operations described herein. The storages 110, 112 may include both non-volatile memory and volatile memory devices. The non-volatile memory includes solid-state memories, such as NAND flash memory, magnetic and optical storage media, or any other suitable data storage device that retains data when the system 100 is deactivated or loses electrical power. The volatile memory includes static and dynamic random-access memory (RAM) that stores program instructions and data during operation of the system 100.

The GPU of the client device 104 may include hardware and software for display of at least two-dimensional (2D) and optionally three-dimensional (3D) graphics to a display device 114 of the client. The display device 114 may include an electronic display screen, projector, printer, or any other suitable device that reproduces a graphical display. In some examples, the processor 108 of the client 104 executes software programs using the hardware functionality in the GPU to accelerate the performance of machine learning or other computing operations described herein.

The HMI controls 116 of the client 104 may include any of various devices that enable the client device 104 of the system 100 to receive control input from workers or other users. Examples of suitable input devices that receive human interface inputs may include keyboards, mice, trackballs, touchscreens, voice input devices, graphics tablets, and the like. The HMI controls may be utilized to provide a user with a user interface, examples of which are described herein.

The network devices 118, 120 may each include any of various devices that enable the server 102 and client device 104, respectively, to send and/or receive data from external devices over the network 122. Examples of suitable network devices 118, 120 include a network adapter or peripheral interconnection device that receives data from another computer or external data storage device, which can be useful for receiving large sets of data in an efficient manner.

The annotation web application 124 is an example of a software application executed by the server 102. When executed, the annotation web application 124 may use various algorithms to perform aspects of the operations described herein, and can be in communication with a user interface of the client device 104 to enable the user to perform tasks described herein. In an example, the annotation web application 124 may include instructions executable by the processor 106 of the server 102 as discussed above. Computer-executable instructions may be compiled or interpreted from computer programs created using a variety of programming languages and/or technologies, including, without limitation, and either alone or in combination, JAVA, C, C++, C#, VISUAL BASIC, JAVASCRIPT, PYTHON, PERL, PL/SQL, etc. In general, the processor 106 receives the instructions, e.g., from the storage 110, a computer-readable medium, etc., and executes these instructions, thereby performing one or more processes, including one or more of the processes described herein. Such instructions and other data may be stored and transmitted using a variety of computer-readable media.

The web client 126 may be a web browser, or other web-based client, executed by the client device 104. When executed, the web client 126 may allow the client device 104 to access the annotation web application 124 to display user interfaces of the annotation web application 124. The web client 126 may further provide input received via the HMI controls 116 to the annotation web application 124 of the server 102 over the network 122.

In artificial intelligence (AI) or machine learning systems, model-based reasoning refers to an inference method that operates based on a machine learning model 128 of a worldview to be analyzed. Generally, the machine learning model 128 is trained to learn a function that provides a precise correlation between input values and output values. At runtime, a machine learning engine uses the knowledge encoded in the machine learning model 128 against observed data to derive conclusions such as a diagnosis or a prediction. One example machine learning system may include the TensorFlow AI engine made available by Alphabet Inc. of Mountain View, Calif., although other machine learning systems may additionally or alternately be used. As discussed in detail herein, the annotation web application 124 and machine learning model 128 may be configured to recognize and annotate features of the image data 132 for use in the efficient and scalable ground truths generation system and methods to produce high precision (pixel level accuracy) annotations that are used to develop object detection, localization, and/or tracking.

The image data source 130 may be a camera, e.g., mounted on a moving object such as car, wall, pole, or installed in a mobile device, configured to capture image data 132. In another example, the image data input 132 may be an interface, such as the network device 118 or an interface to the storage 110, for the retrieval of previously-captured image data 132. The image data 132 may be video, e.g., a sequence of images. Each image in the image data 132 may be referred to herein as a frame. For privacy concerns, faces and license plates may be blurred from the image data 132 for certain annotation tasks. The image data 132 may be stored and maintained in the storage 110 for later retrieval and processing.

The system 100 may also include a road sign knowledge graph (KG) 134. The knowledge graph may represent a collection of interlinked descriptions of entities—real-world objects (e.g., road signs), events, situations or abstract concepts—where the descriptions utilize a formal structure that allows both people and computers to process them in an efficient and clear manner. The knowledge graph may be a type of database. The entity descriptions of the signs may contribute to one another, forming a network, where each entity represents part of the description of the entities related to it. In embodiments described herein, the knowledge graph is a road sign knowledge graph with descriptions of various signs (e.g., size, shape, etc.) that are sorted and stored in memory 110.

Figure 2:
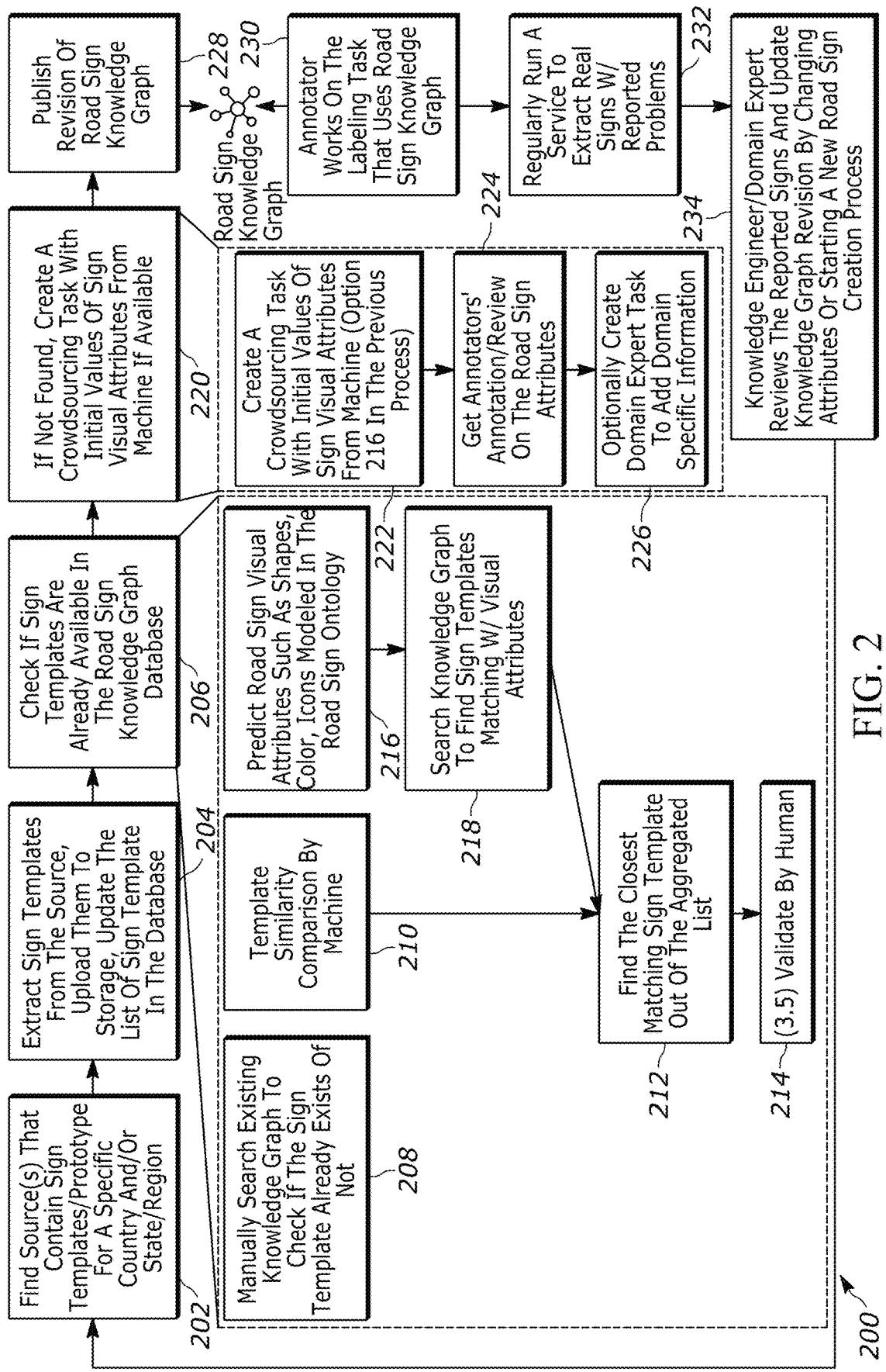
FIG. 2 illustrates a flow chart for constructing and maintaining the road sign knowledge graph, according to an embodiment.

FIG. 2 illustrates a workflow of a road sign knowledge graph construction system 200, according to an embodiment. At 202, a user can find sources that contain sign templates for a specific country, state, and/or region. The user can use the user interface at the client device 104, for example. Using the Internet, for example, the user can find the official documents or public documents that contain sign templates, or image road signs to be used as a baseline or template in the knowledge graph. This task can be distributed to a crowdsourcing platform to allocate it to workers in different countries who understand local languages and road sign nuances of those regions.

A person (or crowdsourced collection of persons) can then extract sign templates from the source, upload them to storage 110, and update the list of sign templates in the road sign database at 204. Unless an automated tool is intelligent, this task is done by one or more human to use a document (such as a PDF, Word, or images) editing tool to extract each sign template in an image format such as SVG, PNG, JPEG, JPG, etc. The file is then stored in an organized file or image storage. This can be stored as image data 132. Automated extraction can be possible if the document is in a machine-processable format such as HTML or formats used in wiki media.

A check is then made at 206 to see if sign template from 204 already exists in the road sign knowledge graph 134. In general, there are three options for this: a manual search 208, or two methods utilizing machine learning models at 210, 216 which will be described below. Other options are contemplated, and these three illustrated options are merely examples of the system.

Starting with a first option at 208, a human can use the user interface of the client device 104 to provide an input of search criteria with knowledge graph attributes such as physical shape of the sign, primary color of the sign, additional shapes or symbols like arrows in the sign, text in the sign, other icons in the sign such as people or animals, etc. In general, the person can input descriptive attributes of the sign. For each of the descriptive attribute input, the system via processor 106 can provide sign templates that match. The inputs can be combined together, such that descriptive attributes input into the system such as "red" and "rectangular" will cause the system to output all signs that are red and rectangular. The human can then determine if the templates output by the system contain one that is fundamentally the same as the template that was input by the human. This can allow for slight variations including difference in size, format and resolution of image, variance in color (RGB) to represent semantically the same color, and the like. If the template input by the user cannot be found in the database, then the user can add the template to the road sign knowledge graph.

FIG. 3 illustrates an example of a user interface for performing the manual search of the existing road sign knowledge graph of step 208. This is one example of a road sign annotation tool. In this example, a common rail road sign in the United States is searched for, with a yellow background, a two black crossing lines, and two "R" letters, as shown in the image of the road sign in FIG. 3. The user can select and filter various visual attributes. In this case, the user has selected circle or ellipse as the physical shape of the sign, and circle with diagonal line as the additional shape, and that additional shape being black. The user has also selected "R R" as the text, with a black text color. The US is chosen as the country of origin of the sign. All of this information combined leads to the rail road crossing sign being shown under the "RSR Image" header. The user can either edit this information, delete the information, or confirm/save the information. Doing so can update the road sign knowledge graph.

The user can input any number of inputs for shape, color, text, icons, country of origin, and the like to manually search through the knowledge graph database for a desired sign. The information input in FIG. 3 is merely an example. If the information input by the user leads to no results from the knowledge graph database, a message may alert the user of such, or the image under the "RSR Image" header may be blank.

Referring back to FIG. 2, another option for checking to see if sign template from 204 already exists in the road sign knowledge graph 134 is shown at 210. At 210, a comparison is made by machine (i.e., machine learning using processor 106 and machine learning models 128). Various machine learning techniques can provide automatic comparisons of the input sign template and those that are already stored in storage. When using the images only that were found and uploaded by the user (i.e., no associated data such as text descriptions of the sign), several techniques can be used such as techniques like deep embedding learning, comparing image descriptors such as scale-invariant feature transform (SIFT) or Histogram of oriented gradients (HoG), or measuring image structural similarity (SSIM). When using the images and associated data input by the user, other matching techniques such as a naïve Bayes classifier can be employed. Using different modalities (e.g., text description of the sign) can improve performance of the system.

At 212, the system proceeds to find the closest matching sign template out of the aggregated list already in storage. The difference of the input sign template and each sign template embedding from 210 can be calculated. At 214, a human (knowledge engineer or annotator) validates if an input sign template already exists or not by comparing the ordered list of sign template images (not embedding) against the sign template input by the user. In short, the output of the various machine learning models implemented at 210 include one or more sign templates from storage that most closely resemble the image input by the user, or a notification is sent to the user that no such template exists. The results of the machine learning model(s) can be shown side-by-side with the input image to allow the user to validate that the input sign is already in existence in the road sign knowledge graph.

A third option is shown at 216. Here, an automated visual attribute recognition and knowledge graph interaction is performed. A visual attribute recognition machine learning model can be implemented in which various attributes (e.g., shape, color, icons, etc.) in the road sign image input by the user are recognized. The visual attribute recognition machine learning model is a deep learning model that is trained with sign templates with visual attributes which are automatically extracted from the knowledge graph. An example of a visual attribute recognition or prediction machine learning model is disclosed in U.S. application Ser. No. 17/404,333, titled ROAD SIGN CONTENT PREDICTION AND SEARCH IN SMART DATA MANAGEMENT FOR TRAINING MACHINE LEARNING MODELS, filed with the U.S. Patent and Trademark Office on the same day as the present disclosure, which is hereby incorporated by reference in its entirety. Sign templates can be augmented (e.g., changing RGB color) during the training phase. The visual attribute recognition machine learning model can output a list of visual attributes of the input image. For example, in the case of an image of a stop sign input into the system, the visual attribute recognition machine learning model may output information such as red color, eight sides, and text presence, and text being white.

At 218, the visual attribute recognition machine learning model can query the knowledge graph with the list of sign templates having associated data that matches this information output by the visual attribute recognition machine learning model. In other words, a search is made to find a match between at least one of the templates stored in the knowledge graph and the output of the visual attribute recognition machine learning model. The sign templates can be computed as an embedding space that is encoded by pre-trained machine learning models. Once again, the interaction of visual attribute prediction or recognition machine learning model and knowledge graph usage can be done according to the methods described in in U.S. application Ser. No. 17/404,333, titled ROAD SIGN CONTENT PREDICTION AND SEARCH IN SMART DATA MANAGEMENT FOR TRAINING MACHINE LEARNING MODELS, filed with the U.S. Patent and Trademark Office on the same day as the present disclosure. For example, the output of the visual attribute recognition model may yield a confidence score of each visual attribute on, for example, a 0 to 1 scale. If a determined visual attribute is above a threshold (e.g., 0.7), it may be determined for this comparison purpose that the visual attribute is indeed on the sign and can be compared to the stored visual attributes of the road sign templates stored in the knowledge graph database. Determined visual attributers below the threshold can be ignored for this comparison purpose.

Once the knowledge graph is relied upon at 218, the system proceeds to 212 and 214 which were explained above—the closest matching sign template is found (e.g., by comparing the similarity of a new sign template against the list of sign templates from 218 in latent space), and then validated by human interaction, i.e. human in the loop.

If the check at 206 to see if sign templates are already available in the road sign knowledge graph yields a positive result (i.e., there already is a road sign template stored in the knowledge graph database), then the system can be complete. No addition to the road sign database is necessary, as it would create redundancy within the system. If, however, the check at 206 to see if sign templates are already available in the road sign knowledge graph yields a negative result (i.e., there are no road sign template stored in the knowledge graph database), then the system proceeds to 220. At 220, if a road sign template is not found in the knowledge graph database, a crowdsourcing task can be created at 220 to annotate the sign template. If a visual attribute recognition or prediction machine learning model is available (see 216 and 218 above), then the crowdsourcing task can be created at 222 with pre-populated values of visual attributes of the road sign from the machine learning output. The annotators within the crowdsource can annotate and review the road sign attributes at 224. Domain-specific information can optionally be provided at 226 by domain experts to supplement the knowledge graph database with this domain-specific information. For example, the same sign template can be considered in multiple or different categories or classes, or main or additional sign types can be used in addition to the category or class name of that sign.

FIG. 4 is an example of a user interface of a crowdsourcing task utilized at 222-226. In such a task, the system may create a web-based application for crowdsourced workers or applications to use to annotate the road sign knowledge graph. A header portion 401 provides an example of an input sign and examples of answers that correspond to the input sign. In this particular example at in the header portion 401, the physical shape is rectangular, and there is a shape inside of the rectangular shape, being a triangle down, and also an arrow indicating to the right. An icon of a person is present, and the color of that icon is black. The primary color of the entire sign is white, and the text is YIELD TO HERE. These examples in the header portion can help guide a person when answering questions in the main portion 403 of the user interface.

In the main portion 403, a road sign image to be annotated and/or added to the road sign knowledge graph is shown at 405, and several questions are asked of the users of the crowdsourcing platform. The user can then look at the image of the road sign at 405 to provide input about the sign, such as: the physical shape being rectangle (question #1), the border color being black (question #2), a forward arrow also being present (question #3) and black in color (question #3.1), and a left arrow (question #3) being present and in black (question #3.1), no additional icons present (question #4), a white primary or background color (question #5), text being present in the sign (question #6), the text reading ONLY and OK within the sign (question #6.1), and the text being black in color (question #6.2), and the text not showing variant information (question #6.3). These are examples of some of the questions that may be provided to the user to input answers to within the user interface. Additional or different questions can be presented to gain additional or other information about the input road sign image. The answers to these questions may be pre-populated from inputs from other crowdsource users.

The user interface in FIG. 4 is merely an example of a user interface that can be used for this process. The tasks can be varied. For example, a list of road signs—instead of one road sign—can be listed with pre-populated values of visual attributes and the annotator can quickly validate and correct them in the top-down selection user interface, or text with autocomplete, etc.

Referring back to FIG. 2, once the knowledge graph database is annotated at 220, a new version of the road sign knowledge graph is updated with new sign templates at 228. In other words, the road sign knowledge graph is updated based on the crowdsourcing tasks at 220. The knowledge graph database can include the new image 405 from the crowdsourcing tasks with the information about the road sign as input by the crowdsource users.

A video annotator who provides labeling on the real-life recorded road scenes is able to use the new, updated version of the road sign knowledge graph available at 230. In particular, the video annotator can view video feed of surroundings of a vehicle to label road signs that appear in the video feed. When the road sign knowledge graph is used for road sign classification, road signs which are not yet in the knowledge graph database can be found from the video feed of the real road scenes. The video annotator can report signs which are not found in the road sign knowledge graph. And, the video annotator can report wrong attributes for existing sings in the road sign knowledge graph. This can improve the accuracy of the already-stored signs in the road sign knowledge graph via-in-loop validation.

Figure 5:
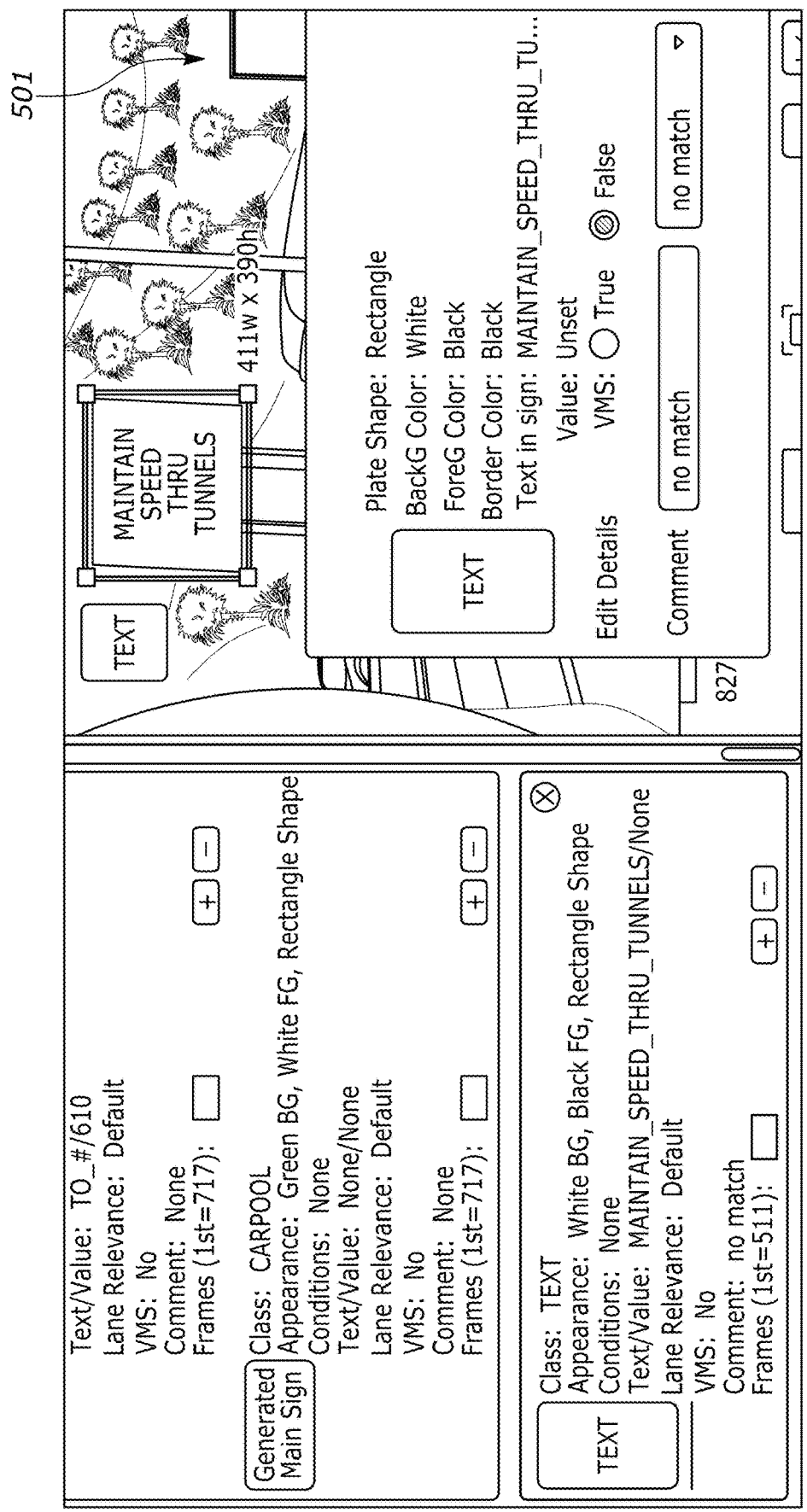
FIG. 5 illustrates an example of a user interface for a video annotator to perform a labeling task that uses the road sign knowledge graph.

FIG. 5 illustrates an example of a user interface for a video annotator to perform the functions of step 230. The user interface includes a screenshot 501 of an image from the live video from the image source with a road sign not yet part of the road sign knowledge graph, in this case a sign reading MAINTAIN SPEED THRU TUNNELS. The video annotator can leave a comment—i.e., "no match"—indicating that the current version of the knowledge graph database does not have a stored road sign template that matches the one shown in the image 501. The screenshot 501 along with the information provided by the video annotator may be provided to a knowledge graph annotator for finding and adding a sign template to the knowledge graph database that matches the sign seen in the screenshot 501.

Referring back to FIG. 2, periodic service can be performed at 232 to extract real signs with problems reported by the video annotator at 230. Once the video annotator reports wrong attributes for existing signs in the road sign knowledge graph, the system can access the following: feedback records in the road sign labeling application made by the video annotator, the real images of the scene, either directly (e.g., from image data from image source) or through applications that crop the sign image out of the frame from the video annotators along with comments left by the video annotator. The comments left by the video annotator may include information that is wrong with (or missing from) the road sign knowledge graph about the road sign, such as its classification, its shape, its color, etc.

At 234, based on the comments left by the video annotator at 232, all extracted information is visualized in a web-based application to ask domain experts for action with respect to the reported signs. In other words, knowledge engineers or domain experts review the reported signs from 232, and update the knowledge graph database by manually changing attributes that are stored about the road sign in question. The domain experts may correct attributes regarding the sign if the sign is already stored in the knowledge graph database, or may search for or create a new sign template if the sign in question is one that is not stored in the knowledge graph database, or may ignore the feedback from the video annotator and leave the knowledge graph database as-is.

FIG. 6 illustrates an example of a user interface having a dashboard for managing feedback from the video annotators. Here, all extracted information from the video annotators is organized and made available on a web-based application to ask domain experts (e.g., knowledge graph annotators) to take actions on the reported signs. The road signs may be grouped such that similar or identical signs appear in a group, based on their similarity in visual attributes. The knowledge graph annotator may then create a new sign template for each group of signs.

In general, the processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system of constructing a road sign knowledge graph for use in machine-learning road sign recognition, including labeling tools to train machine learning models, the system comprising:
   a user interface;
   a storage configured to maintain (i) a road sign knowledge graph including a database of stored road sign templates accompanied with a plurality of stored visual attributes of the stored road sign templates, and (ii) image data including video having a sequence of frames, and annotations of the frames that indicate visual attributes of road signs identified in respective frames; and a processor in communication with the storage and the user interface, the processor programmed to:
receive an input road sign template from a road sign template source,
determine a plurality of visual attributes of the input road sign template utilizing a visual attribute recognition machine learning model,
query the road sign knowledge graph for one of the stored road sign templates having stored visual attributes that correspond with the plurality of visual attributes of the input road sign template,
in response to the query yielding one of the stored road sign templates with stored visual attributes that correspond with the plurality of visual attributes of the input road sign template, not update the road sign knowledge graph to include the input road sign template, and
in response to the query failing to yield one of the stored road sign templates with stored visual attributes that correspond with the plurality of visual attributes of the input road sign template, receive, via the user interface, annotations corresponding to the visual attributes of the input road sign template, and update the road sign knowledge graph to include the input road sign template.

2. The system of claim 1, wherein the plurality of visual attributes of the input road sign template includes at least one of a background color, a presence of text, and a symbol.

3. The system of claim 1, wherein the annotations are received from a crowdsourcing platform such that a plurality of crowdsourcing annotators provide the annotations.

4. The system of claim 1, wherein the processor is programmed to, based on the query failing to yield one of the stored road sign templates with stored visual attributes that correspond with the plurality of visual attributes of the input road sign template, receive domain-specific information regarding the input road sign template and update the road sign knowledge graph to include the domain-specific information.

5. The system of claim 1, wherein the processor is programmed to, based on the query yielding one of the stored road sign templates with stored visual attributes that correspond with the plurality of visual attributes of the input road sign template, receive human-in-loop validation via the user interface that the input road sign template corresponds to the one of the stored road sign templates in the road sign knowledge graph.

6. The system of claim 1, wherein the processor is programmed to:
receive annotations from a video annotator regarding incorrect visual attributes for the input road sign template stored in the road sign knowledge graph, and
update the road sign knowledge graph with corrected visual attributes via the user interface.

7. A method of constructing and maintaining a road sign knowledge graph for use in a machine-learning road sign recognition system, the method comprising:
maintaining a road sign knowledge graph including a database of stored road sign templates accompanied with a plurality of stored visual attributes corresponding to the stored road sign templates;
maintaining image data including video having a sequence of frames, and annotations of one or more of the frames that indicate visual attributes of road signs identified in the respective frames;
receiving an input road sign template from a road sign template source;
determining a plurality of visual attributes of the input road sign template utilizing a visual attribute recognition machine learning model;
querying a road sign knowledge graph for one of the stored road sign templates having stored visual attributes that correspond with the plurality of visual attributes of the input road sign template;
confirming the input road sign template is already stored in the road sign knowledge graph based on a comparison between the visual attributes of the input road sign template and the one of the stored road sign templates; and
preventing the input road sign template form being added to the road sign knowledge graph based on the confirming to prevent redundancy within the road sign knowledge graph.

8. The method of claim 7, further comprising:
confirming the input road sign template is not already stored in the road sign knowledge graph based on a comparison between the visual attributes of the input road sign template and the stored visual attributes of the stored road sign templates; and
updating the road sign knowledge graph to include the input road sign template.

9. The method of claim 8, further comprising:
receiving domain-specific information regarding the input road sign template and update the road sign knowledge graph to include the domain-specific information.

10. The method of claim 8, further comprising:
receiving annotations corresponding to the visual attributes of the input road sign template, and updating the road sign knowledge graph to include the visual attributes.

11. The method of claim 8, wherein the annotations are received via a crowdsourcing platform of a plurality of annotators.

12. The method of claim 8, further comprising:
receiving annotations from a video annotator regarding incorrect visual attributes for the input road sign in the road sign knowledge graph based on a visual check of a video feed of a real-world road sign corresponding to the input road sign.

13. The method of claim 7, wherein the utilizing the visual attribute recognition machine learning model includes determining probabilities of predefined visual attributes presented in the input road sign template.

14. The method of claim 7, further comprising:
receiving human-in-loop validation via a user interface that the input road sign template corresponds to the one of the stored road sign templates in the road sign knowledge graph.

15. A system comprising:
a user interface; and
a processor in communication with the display and programmed to:
receive an input road sign template;
execute a visual attribute prediction model to determine probabilities of predefined visual attributes present in the input road sign template;
when the determined probabilities of predefined visual attributes correspond with stored visual attributes of one or more stored road sign templates within a road sign knowledge graph, prevent the input road sign template from being stored in the road sign knowledge graph; and when the determined probabilities of predefined visual attributes do not correspond with stored visual attributes of the one or more stored road sign templates, receive annotations corresponding to the visual attributes present in the input road sign template, and update the road sign knowledge graph to include the input road sign template.

16. The system of claim 15, wherein the input road sign template is received from a road sign template source containing a plurality of official road sign templates.

17. The system of claim 15, wherein the input road sign template is received from a video annotator viewing video feed, and the input road sign template includes annotations that indicate visual attributes of the input road sign as identified by the video annotator.

18. The system of claim 15, wherein the processor is further programmed to:

when the determined probabilities of predefined visual attributes do not correspond with stored visual attributes of the one or more stored road sign templates, receive domain-specific information regarding the input road sign template and update the road sign knowledge graph to include the domain-specific information.

19. The system of claim 15, wherein the processor is further programmed to:

when the determined probabilities of predefined visual attributes correspond with the stored visual attributes of the one or more stored road sign templates, receive human-in-loop validation via a user interface that the input road sign template corresponds to the one or more stored road sign templates in the road sign knowledge graph.

20. The system of claim 15, wherein the processor is further programmed to:

receive annotations from a video annotator regarding incorrect visual attributes for the input road sign template stored in the road sign knowledge graph, and update the road sign knowledge graph with corrected visual attributes via a user interface.

* * * * *